United States Patent
Marinier et al.

(10) Patent No.: US 11,665,572 B2
(45) Date of Patent: May 30, 2023

(54) METHOD AND APPARATUS FOR ADJUSTING CHANNEL QUALITY INDICATOR FEEDBACK PERIOD TO INCREASE UPLINK CAPACITY

(71) Applicant: InterDigital Technology Corporation, Wilmington, DE (US)

(72) Inventors: Paul Marinier, Brossard (CA); Douglas Castor, Norristown, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 17/893,331

(22) Filed: Aug. 23, 2022

(65) Prior Publication Data
US 2022/0408297 A1 Dec. 22, 2022

Related U.S. Application Data

(63) Continuation of application No. 16/874,016, filed on May 14, 2020, now Pat. No. 11,470,491, which is a
(Continued)

(51) Int. Cl.
*H04W 24/10* (2009.01)
*H04L 1/00* (2006.01)
*H04L 5/00* (2006.01)

(52) U.S. Cl.
CPC .......... *H04W 24/10* (2013.01); *H04L 1/0026* (2013.01); *H04L 1/0027* (2013.01); *H04L 5/0057* (2013.01)

(58) Field of Classification Search
CPC .... H04W 24/10; H04L 1/0026; H04L 1/0027; H04L 5/0057
See application file for complete search history.

(56) References Cited

U.S. PATENT DOCUMENTS 6,810,236 B2   10/2004   Terry et al.
6,985,453 B2    1/2006   Lundby et al.
(Continued)

FOREIGN PATENT DOCUMENTS

EP   1351424 A2   10/2003
EP   1487144 A1   12/2004
(Continued)

OTHER PUBLICATIONS

3rd Generation Partnership Project; Technical Specification Group Radio Access Network; High Speed Downlink Packet Access (HSDPA); Overall description; Stage 2 (Release 6), 3GPP TS 25.308 V6.3.0, Dec. 2004, 28 pages.
(Continued)

*Primary Examiner* — Min Jung
(74) *Attorney, Agent, or Firm* — Julian F. Santos

(57) ABSTRACT

A method and apparatus for adjusting a channel quality indicator (CQI) feedback period to increase uplink capacity in a wireless communication system are disclosed. The uplink capacity is increased by reducing the uplink interference caused by CQI transmissions. A wireless transmit/receive unit (WTRU) monitors a status of downlink transmissions to the WTRU and sets the CQI feedback period based on the status of the downlink transmissions to the WTRU. A base station monitors uplink and downlink transmission needs. The base station determines the CQI feedback period of at least one WTRU based on the uplink and downlink transmission needs and sends a command to the WTRU to change the CQI feedback period of the WTRU.

18 Claims, 2 Drawing Sheets

Related U.S. Application Data continuation of application No. 15/978,906, filed on May 14, 2018, now Pat. No. 10,694,414, which is a continuation of application No. 15/274,336, filed on Sep. 23, 2016, now abandoned, which is a continuation of application No. 14/323,478, filed on Jul. 3, 2014, now Pat. No. 9,479,314, which is a continuation of application No. 11/507,746, filed on Aug. 22, 2006, now Pat. No. 8,787,329.

(60) Provisional application No. 60/710,986, filed on Aug. 24, 2005.

(56) References Cited

U.S. PATENT DOCUMENTS

| | | | |
|---|---|---|---|
| 6,993,294 | B2 | 1/2006 | Nobukiyo et al. |
| 7,130,588 | B2 | 10/2006 | Niwano |
| 7,200,405 | B2 | 4/2007 | Rudolf et al. |
| 7,295,850 | B2 | 11/2007 | Pedersen |
| 7,392,014 | B2 | 6/2008 | Baker et al. |
| 7,477,876 | B2 | 1/2009 | Das et al. |
| 7,499,721 | B2 | 3/2009 | Kim et al. |
| 7,508,778 | B2 | 3/2009 | Yafuso |
| 7,558,535 | B2 | 7/2009 | Cho et al. |
| 7,640,373 | B2 | 12/2009 | Cudak et al. |
| 8,787,329 | B2 | 7/2014 | Marinier et al. |
| 9,184,898 | B2 | 11/2015 | Love et al. |
| 9,973,297 | B2 | 5/2018 | Marinier et al. |
| 10,432,382 | B2 * | 10/2019 | Kwon ............... H04B 17/30 |
| 10,694,414 | B2 | 6/2020 | Marinier et al. |
| 2003/0087605 | A1 | 5/2003 | Das et al. |
| 2003/0189918 | A1 | 10/2003 | Das et al. |
| 2004/0004174 | A1 | 1/2004 | Schworer et al. |
| 2004/0022213 | A1 | 2/2004 | Choi et al. |
| 2004/0058699 | A1 | 3/2004 | Jonsson et al. |
| 2004/0110473 | A1 | 6/2004 | Rudolf et al. |
| 2004/0114574 | A1 | 6/2004 | Zeira et al. |
| 2004/0219883 | A1 | 11/2004 | Pauli et al. |
| 2004/0219926 | A1 | 11/2004 | Kim et al. |
| 2005/0041622 | A1 | 2/2005 | Dubuc et al. |
| 2005/0094615 | A1 | 5/2005 | Kim et al. |
| 2005/0105589 | A1 | 5/2005 | Sung et al. |
| 2005/0117536 | A1 | 6/2005 | Cho et al. |
| 2005/0174982 | A1 | 8/2005 | Uehara et al. |
| 2005/0191965 | A1 | 9/2005 | Yu et al. |
| 2005/0201296 | A1 | 9/2005 | Vannithamby et al. |
| 2005/0201474 | A1 | 9/2005 | Cho et al. |
| 2005/0207367 | A1 | 9/2005 | Onggosanusi et al. |
| 2005/0207374 | A1 | 9/2005 | Petrovic et al. |
| 2005/0243793 | A1 | 11/2005 | Kim et al. |
| 2005/0250506 | A1 | 11/2005 | Beale et al. |
| 2006/0046738 | A1 | 3/2006 | Guan et al. |
| 2006/0233124 | A1 | 10/2006 | Palanki |
| 2007/0030828 | A1 | 2/2007 | Vimpari et al. |
| 2007/0030839 | A1 | 2/2007 | Vimpari et al. |
| 2007/0191024 | A1 | 8/2007 | Kim et al. |
| 2007/0254595 | A1 | 11/2007 | Yoon et al. |
| 2009/0067329 | A1 * | 3/2009 | Sumasu ............... H04W 72/085 370/252 |
| 2009/0247180 | A1 | 10/2009 | Higuchi et al. |
| 2010/0284297 | A1 | 11/2010 | Kim et al. |
| 2010/0284326 | A1 | 11/2010 | Oh |
| 2013/0301623 | A1 * | 11/2013 | Toda ............... H04L 5/0096 370/336 |

FOREIGN PATENT DOCUMENTS

| | | | |
|---|---|---|---|
| EP | 1566913 | A1 | 8/2005 |
| EP | 1569492 | A2 | 8/2005 |
| JP | 2002320262 | A | 10/2002 |
| JP | 2003204298 | A | 7/2003 |
| JP | 2005521360 | A | 7/2005 |
| JP | 2005237005 | A | 9/2005 |
| JP | 2007511965 | A | 5/2007 |
| JP | 2014112913 | A | 6/2014 |
| JP | 2015000567 | A | 1/2015 |
| JP | 2015092739 | A | 5/2015 |
| JP | 2015183216 | A | 10/2015 |
| KR | 20030046272 | A | 6/2003 |
| KR | 20030077733 | A | 10/2003 |
| KR | 20030080165 | A | 10/2003 |
| KR | 20050082333 | A | 8/2005 |
| WO | WO 2003/088695 | A1 | 10/2003 |
| WO | WO 2004004173 | A1 | 1/2004 |
| WO | WO 2004057887 | A1 | 7/2004 |
| WO | WO 2005050852 | A2 | 6/2005 |
| WO | WO 2008054099 | A1 | 5/2008 |

OTHER PUBLICATIONS

Examination Notification, Taiwanese Patent Application No. 104105938, dated Apr. 12, 2016, 7 pages.

Siemens,Fast CQI Requesting, 3GPP Tdoc R1-02-1296, TSG-RAN Working Group 1 #29, Shanghai, China, Nov. 5-8, 2002, 5 pages.

Official Notice of Rejection, Japanese Patent Application No. 2015-183216, dated Dec. 6, 2016, 4 pages.

United States Office Action, U.S. Appl. No. 14/323,478, dated Oct. 1, 2015, 22 pages.

3rd Generation Partnership Project; Universal Mobile Telecommunications System (UMTS); Radio Resource Control (RRC) protocol specification (Release 6), 3GPP TS 25.331 V6.6.0, Jun. 2005, 1157 pages.

Communication Pursuant to Article 94(3) EPC, European Patent Application No. 06 789 892.4, dated May 16, 2017, 6 pages.

English Language Abstract, Japanese Patent Application No. 2015-183216, dated Oct. 22, 2015, 2 pages.

English Language Abstract, Korean Patent Application No. KR-2003-0046272, dated Jun. 12, 2003, 1 Page.

3rd Generation Partnership Project; Technical Specification Group Radio Access Network; Radio Resource Control (RRC) Protocol Specification (Release 4), 3GPP TS 25.331 V4.17.0, Mar. 2005, 953 pages.

3rd Generation Partnership Project; Technical Specification Group Radio Access network; Radio Resource Control (RRC); Protocol Specification (Release 6), 3GPP TS 25.331 V6.10.0, Jun. 2006, 1,226 pages.

Official Notice of Rejection (English Translation), Japanese Patent Application No. 2015-183216, dated Dec. 6, 2016, 5 pages.

3rd Generation Partnership Project; Technical Specification Group Radio Access Network; Physical layer procedures (FDD) (Release 5), 3GPP TS 25.214 V5.11.0, Jun. 2005, 51 pages.

English Language Abstract, Japanese Patent Application No. JP2015000567, dated Jan. 5, 2015, 1 page.

3rd Generation Partnership Project; Technical Specification Group Radio Access Network; HSDPA Enhancements (Release 6), 3GPP TR 25.899 V1.0.0 (3GPP TSG-RAN#24 RP-040222), May 2004, 64 pages.

Norwegian Search Report, Norwegian Application No. 20080876, dated Feb. 17, 2017, 3 pages.

3rd Generation Partnership Project; Technical Specification Group Radio Access Network; Continuous Connectivity for Packet Data Users; (Release 7), 3GPP TR 25.903 V1.0.0, May 2006, 104 pages.

3rd Generation Partnership Project; Technical Specification Group Radio Access Network; FDD Enhanced Uplink; Overall description; Stage 2 (Release 6), 3GPP TS 25.309 V6.3.0, Jun. 2006, 33 pages.

3rd Generation Partnership Project; Technical Specification Group Radio Access Network; High Speed Download Packet Access (HSDPA) enhancements (Release 6), 3GPP TR 25.899 V6.1.0, Sep. 2004, 68 pages.

3rd Generation Partnership Project; Technical Specification Group Radio Access Network; Physical layer procedures (FDD) (Release 6), 3GPP TS 25.214 V6.9.0, Jun. 2006, 59 pages.

Soo-Yong Jeon et al.,An Enhanced Channel-Quality Indication (CQI) Reporting Scheme for HSDPA Systems, IEEE Communications Letters, vol. 9, No. 5, May 2005, 5 pages.

(56) References Cited

OTHER PUBLICATIONS

English Language Abstract, Korean Patent Application No. KR20030080165, dated Oct. 11, 2003, 1 page.
United States Office Action, U.S. Appl. No. 15/274,336, dated Oct. 5, 2017, 8 pages.
Letter From Foreign Associate with English Translation of Office and Action and Search Report, Norwegian Patent Application No. 20080876, dated Mar. 6, 2017, 5 pages.
Notice of Rejection, Japanese Patent Application No. 2015-000567, dated Mar. 1, 2016, 5 pages.
Official Notice of Rejection, Japanese Patent Application No. 2014-014590, dated Jun. 16, 2015, 3 pages.
Technical Specification Universal Mobile Telecommunications System (UMTS) FDD enhanced uplink; Overall description; Stage 2 (Release 6), ETSI TS 125 309 V6.3.0, Jun. 2005, 69 pages.
3rd Generation Partnership Project; Technical Specification Group Radio Access Network; Multiplexing and channel coding (FDD) (Release 6), 3GPP TS 25.212 V6.5.0, Jun. 2005, 35 pages.
NTT DoCoMo,Physical Channels and Multiplexing in Evolved UTRA Downlink, 3GPP Tdoc R1-050590, 3GPP TSG RAN WG1 Ad Hoc on LTE, Sophia Antipolis, France, Jun. 20-21, 2005, 24 pages.
3rd Generation Partnership Project; Technical Specification Group Radio Access Network; Radio Resource Control RRC); Protocol Specification (Release 5), 3GPP TS 25.331 V5.17.0, Jun. 2006, 1,045 pages.
Japanese Official Notice of Rejection, Japanese Patent Application No. 2013-086903, dated Oct. 22, 2013, 4 pages.
Notice of Rejection (English translation), Japanese Patent Application No. 2015-000567, dated Mar. 1, 2016, 7 pages.
Official Notice of Rejection (English Translation), Japanese Patent Application No. 2014-014590, dated Jun. 16, 2015, 4 pages.
3rd Generation Partnership Project; Technical Specification Group Radio Access Network; FDD Enhanced Uplink Overall description; Stage 2 (Release 6), 3GPP TS 25.309 V6.6.0, Jun. 2005, 33 pages.
3rd Generation Partnership Project; Technical Specification Group Radio Access Network; High Speed Downlink Packet Access (HSDPA); Overall description; Stage 2 (Release 5), 3GPP TS 25.308 V5.4.0, Mar. 2003, 28 pages.
3rd Generation Partnership Project; Technical Specification Group Radio Access Network; High Speed Downlink Packet Access (HSDPA); Overall description; Stage 2 (Release 7), 3GPP TS 25.308 V7.0.0, Mar. 2006, 28 pages.
Mitsubishi Electric,Evaluation of CQI feedback schemes, 3GPP Tdoc R1-030254, 3GPP TSG RAN WG1#31 Tokyo, Japan, Feb. 18-21, 2003, 8 pages.
3rd Generation Partnership Project; Technical Specification Group Radio Access Network; HSDPA Enhancements (Release 6), 3GPP TR 25.899 V1.0.0, May 2004, 7 pages.

Examination Notification (English Translation), Taiwanese Patent Application No. 104105938, dated Apr. 12, 2016, 4 pages.
Lucent Technologies,UL overhead reduction by using DL activity dependent CQI reporting, 3GPP Tdoc R1-02-1069, 3GPP TSG-RAN WG1#28, Seattle, WA, USA, Aug. 19-22, 2002, 3 pages.
3rd Generation Partnership Project; Technical Specification Group Radio Access Network; Radio Resource Control (RRC); Protocol specification (Release 5), 3GPP TS 25.331 V5.13.0, Jun. 2005, 1,044 pages.
Official Notice of Rejection, Japanese Patent Application No. 2016-110242, dated Sep. 26, 2017, 4 pages.
English Language Abstract, Japanese Patent Application No. JP2002320262, dated Oct. 31, 2002,1 page.
3rd Generation Partnership Project Technical Specification Group Radio Access Network RRC Protocol Specification (Release 1999), 3GPP TS 25.331 V3.21.0, Dec. 2004, 879 pages.
Japanese Official Notice of Rejection (English Translation)., Japanese Patent Application No. 2013-086903, dated Oct. 22, 2013, 4 pages.
Office Action, Norwegian Patent Application No. 20080876, dated Feb. 17, 2017, 6 pages.
Notice of Rejection (English Translation), Japanese Patent Application No. 2016-110242, dated Sep. 26, 2017, 5 pages.
Siemens,E-SCCH for absolute scheduling grant signalling, 3GPP Tdoc R1-041140, 3GPP TSG RAN WG1 #38bis, Seoul, South Korea, 2 pages.
Patent Abstract of Japan, Japanese Patent Application No. 2015-092739, dated May 14, 2015, 1 page.
Siemens,Proposal on how to realize Continuous Connectivity for Packet Data Users, 3GPP Tdoc R1-050821, 3GPP TSG-RAN Working Group 1 Meeting #42 London, UK, Aug. 29-Sep. 2, 2005, 6 pages.
English Language Abstract, Korean Patent Application No. KR-2003-0077733, dated Oct. 4, 2003, 1 page.
Mitsubishi Electric,Timing for Enhanced CQI Procedures, 3GPP Tdoc R1-031220, 3GPP TSG RAN WG1#35, Lisbon, Portugal, Nov. 17-21, 2003, 8 pages.
3rd Generation Partnership Project; Technical Specification Group Radio Access Network; High Speed Downlink Packet Access (HSDPA); Overall description; Stage 2 (Release 5), 3GPP TS 25.308 V5.7.0, Dec. 2004, 28 pages.
Mitsubishi Electric,CQI Feedback Rate Change, 3GPP Tdoc R1-28(02)1089, 3GPP TSG-RAN Working Group 1 meeting #28 Seattle, USA, Aug. 19-22, 2002, 15 pages.
3rd Generation Partnership Project; Technical Specification Group Radio Access Network; HSDPA Enhancements (Release 6) The, 3GPP TR 25.899 V1.0.0, May 2004, 64 pages.

* cited by examiner

METHOD AND APPARATUS FOR ADJUSTING CHANNEL QUALITY INDICATOR FEEDBACK PERIOD TO INCREASE UPLINK CAPACITY

CROSS REFERENCE TO RELATED APPLICATIONS

This application is a continuation of U.S. patent application Ser. No. 16/874,016, filed on May 14, 2020, which is a continuation of U.S. patent application Ser. No. 15/978,906, filed on May 14, 2018, now U.S. Pat. No. 10,694,414, which is a continuation of U.S. patent application Ser. No. 15/274,336, filed on Sep. 23, 2016, now abandoned, which is a continuation of U.S. patent application Ser. No. 14/323,478, filed on Jul. 3, 2014, now U.S. Pat. No. 9,479,314, which is a continuation of U.S. patent application Ser. No. 11/507,746, filed on Aug. 22, 2006, now U.S. Pat. No. 8,787,329, which claims the benefit of U.S. Provisional Patent Application No. 60/710,986, filed Aug. 24, 2005, which are hereby incorporated by reference herein.

FIELD OF INVENTION

The present invention is related to a wireless communication system. More particularly, the present invention is related to a method and apparatus for adjusting a channel quality indicator (CQI) feedback period to increase uplink capacity in a wireless communication system.

BACKGROUND

In a wireless communication system, such as universal mobile telecommunication services (UMTS) terrestrial radio access (UTRA), a wireless transmit/receive unit (WTRU) sends a channel quality indicator (CQI), (or channel quality estimates), to a base station. The CQI is used for adaptive modulation and coding (AMC), channel sensitive scheduling, or the like. The base station determines an optimal modulation scheme and coding rate for the WTRUs based on the reported CQIs. The base station also uses the reported CQIs when determining which WTRUs should be allowed for transmission.

The frequency of generation and transmission of the CQIs is controlled by parameters specified by a radio network controller (RNC). The parameters are given to the WTRU through radio resource control (RRC) signaling at call setup or upon reconfiguration.

The transmission of CQIs by the WTRUs, although beneficial for optimizing the capacity on the downlink, generates interference on the uplink. This interference may decrease the uplink capacity of the wireless communication system when the number of WTRUs that are required to transmit a CQI is large. Furthermore, it is often the case that the transmission of CQIs by certain WTRUs is superfluous. Such a situation arises when a WTRU has no pending transmission on the downlink due to a period of inactivity at the application level.

The interference caused by the transmission of CQIs from non-active WTRUs may be reduced by updating the CQI parameters so that the CQIs are generated by those WTRUs less frequently. However, this approach does not work well in practice because the CQI parameter update is performed through the RRC signaling, which is slow. By the time the CQI parameter update is communicated to the WTRU, the user of the WTRU may have resumed activity, and performance would suffer until a new update is sent to restore the original frequency of CQI generation.

In addition, in some circumstances it is desirable to reduce the interference from CQI transmissions during a limited period of time in order to increase the capacity available on the uplink when there is a temporary need for more capacity, (e.g., when one user has a large amount of data to upload, such as a picture).

Therefore, it is desirable to provide a method to adjust the CQI feedback period more quickly and efficiently to increase uplink capacity.

SUMMARY

The present invention is related to a method and apparatus for adjusting a CQI feedback period to increase uplink capacity in a wireless communication system. The uplink capacity is increased by reducing the uplink interference caused by CQI transmissions. In accordance with a first embodiment of the present invention, a WTRU monitors a status of downlink transmissions to the WTRU and sets the CQI feedback period based on the status of the downlink transmissions to the WTRU. In accordance with a second embodiment of the present invention, a base station monitors uplink and downlink transmission needs. The base station determines the CQI feedback period of at least one WTRU based on the uplink and downlink transmission needs and sends a command to the WTRU to change the CQI feedback period of the WTRU.

DETAILED DESCRIPTION OF THE PREFERRED EMBODIMENTS

When referred to hereafter, the terminology "WTRU" includes but is not limited to a user equipment, a mobile station (STA), a fixed or mobile subscriber unit, a pager, or any other type of device capable of operating in a wireless environment. When referred to hereafter, the terminology "base station" includes but is not limited to a Node-B, a site controller, an access point (AP) or any other type of interfacing device in a wireless environment.

The features of the present invention may be incorporated into an integrated circuit (IC) or be configured in a circuit comprising a multitude of interconnecting components.

Figure 1:
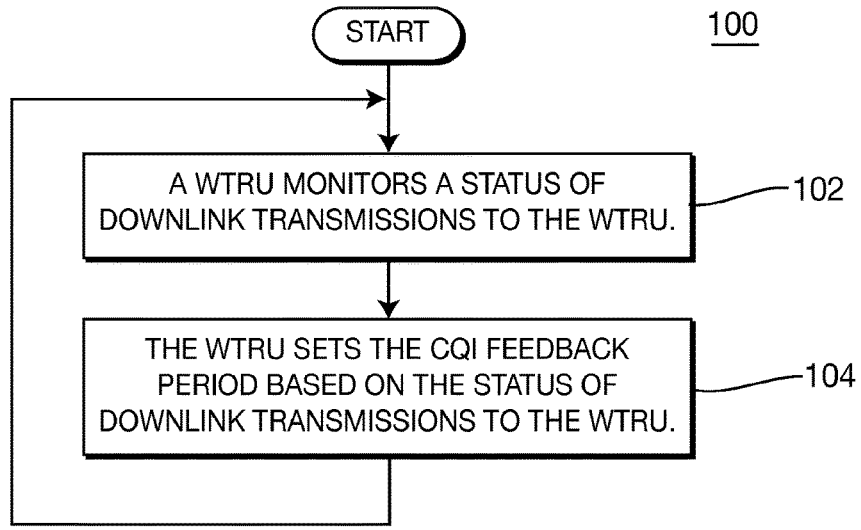
FIG. 1 is a flow diagram of a process for adjusting a CQI feedback period in accordance with a first embodiment of the present invention.

FIG. 1 is a flow diagram of a process 100 for adjusting a CQI feedback period in accordance with a first embodiment of the present invention. In accordance with the first embodiment, a WTRU autonomously adjusts the CQI feedback period based on downlink transmission status. The WTRU is initially configured with a normal CQI feedback period, and the WTRU reports a CQI to a base station via an uplink channel every CQI feedback period.

The WTRU monitors the status of downlink transmissions to the WTRU (step 102). In monitoring the downlink transmission status, the WTRU may maintain a counter for counting the number of consecutive transmission time intervals (TTIs) that do not include a transmission for the WTRU. For example, in high speed downlink packet access (HSDPA), the number of TTIs that do not include a transmission for the WTRU may be determined by detecting a valid cyclic redundancy check (CRC) on downlink transmissions on a high speed shared control channel (HS-SCCH). The counter is reset when a valid downlink transmission to the WTRU is detected, (e.g., in HSDPA, a valid CRC is detected on the HS-SCCH).

The WTRU then adjusts the CQI feedback period based on the status of the downlink transmissions (step 104). A piece-wise function or a look-up table (LUT) may be used to select a new CQI feedback period based on the counter value, such that the CQI feedback period is increased as the counter value increases, and the CQI feedback period is decreased as the counter value decreases. An exemplary mapping scheme for mapping the counter value to the CQI feedback period is shown in Table 1. As shown in Table 1, the increased CQI feedback periods may be a factor of the normal CQI feedback period. The base station may monitor and detect CQIs from the WTRU every normal CQI feedback period regardless of the CQI feedback period setting in the WTRU. With this scheme, it is avoidable to miss CQIs due to inconsistent CQI feedback period settings in the WTRU and the base station. The parameters in Table 1 are configurable via a higher layer signaling, which is preferably performed at call setup.

TABLE 1

| The number of TTIs without a transmission for the WTRU | CQI feedback period |
|---|---|
| 0-31 | normal feedback period, P |
| 32-63 | 2P |
| 64-127 | 3P |
| 128-511 | 4P |
| 512 or higher | 5P |

Alternatively, the WTRU may be given multiple CQI feedback periods, (for example, two (2) CQI feedback periods: an active CQI feedback period and an inactive CQI feedback period), via RRC signaling, and may switch between the CQI feedback periods in accordance with the counter value, (i.e., the number of TTIs without a transmission for the WTRU). For example, when the counter value is below a threshold, the active CQI feedback period is selected, and when the counter value is equal to or above the threshold, the inactive CQI feedback period is selected.

After the WTRU adjusts the CQI feedback period based on the status of the downlink transmissions, the process 100 returns to step 102 to further monitor the downlink transmission status.

Figure 2:
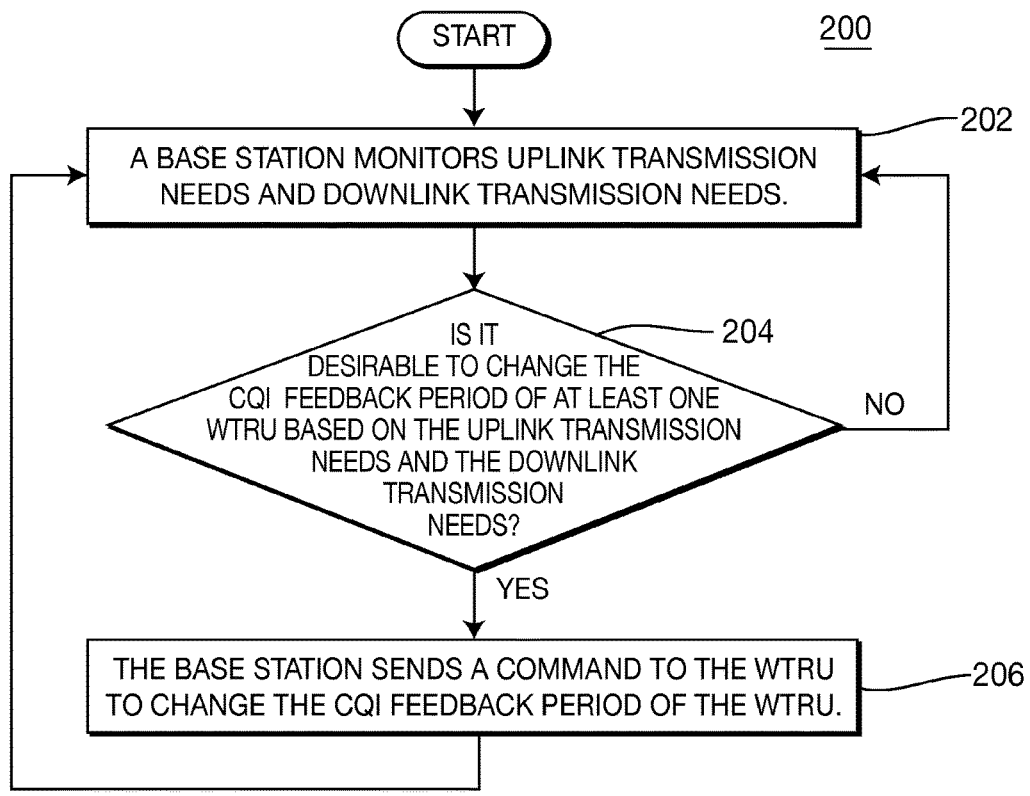
FIG. 2 is a flow diagram of a process for adjusting a CQI feedback period in accordance with a second embodiment of the present invention.

FIG. 2 is a flow diagram of a process 200 for adjusting a CQI feedback period in accordance with a second embodiment of the present invention. In accordance with the second embodiment, a base station sends a command to increase or decrease the CQI feedback period of the WTRUs based on uplink and downlink transmission needs. The base station increases the CQI feedback period, (which means less frequent CQI feedbacks), when the uplink transmission needs increase, while the downlink transmission needs can still be supported with the less frequent CQI feedbacks. As frequent CQI feedbacks are beneficial to downlink performance, the base station trades downlink capacity for uplink capacity on a short term basis.

The base station monitors uplink transmission needs and downlink transmission needs (step 202). The uplink and downlink transmission needs are determined based on an amount of data buffered in each of the WTRUs for uplink transmissions and an amount of data buffered in a base station for downlink transmissions to each of the WTRUs, respectively. The amount of data buffered in the WTRU for uplink transmission is indicated by the WTRU. For example, such indication may be given by a scheduling request, a happy bit or traffic volume measurement as in UTRA Release 6.

Alternatively, the base station may estimate the time required to transmit the data currently in the buffer of each WTRU and the time required to transmit the data buffered in the base station for each WTRU based on average downlink and uplink throughput to and from each of the WTRUs.

The base station determines whether it is desirable to change the CQI feedback period of at least one WTRU based on the uplink transmission needs and the downlink transmission needs (step 204). The base station may increase the CQI feedback period when the uplink transmission needs are high and the downlink transmission needs are low, and may decrease the CQI feedback period, (or restore the original CQI feedback period), when the uplink transmission needs are low or the downlink transmission needs are high.

For example, if, for at least one WTRU, the estimated time required to transmit data in a buffer of the WTRU exceeds a pre-determined threshold, (i.e., the uplink transmission needs are high), it is desirable to reduce the interference caused by CQI transmissions by increasing the CQI feedback period. Therefore, the base station determines if some or all of the downlink transmissions could afford less frequent CQI feedbacks. In order to determine this, the base station may determine if the estimated time required to transmit the data in the buffer of the base station on the downlink is within a pre-determined threshold. If it is determined that some or all of the downlink transmissions may afford less frequent CQI transmissions, (e.g., the estimated time required to transmit the data in the buffer of the base station is within the predetermined threshold), the base station determines to increase the CQI feedback period.

If it is determined at step 204 that it is not desirable to change the CQI feedback period, the process returns to step 202 to further monitor the uplink and downlink transmission needs. If it is determined at step 204 that it is desirable to change the CQI feedback period, the base station then sends a command to at least one WTRU to change the CQI feedback period of the WTRU (step 206). After sending the command, the process 200 returns to step 202 to monitor the uplink and downlink transmission needs.

If the base station subsequently determines that restoring the original CQI feedback period is desirable for some or all of the WTRUs, (i.e., if the base station determines that the estimated time required to transmit the data in the buffer of the base station on the downlink exceeds the pre-determined threshold, or if the base station determines that the estimated time required to transmit the data in the buffer of each of the WTRUs on the uplink is below the pre-determined threshold), the base station sends a command to some or all WTRUs to restore the original CQI feedback period of their CQI transmissions.

The command must be transmitted quickly, (e.g., within a few tens of milliseconds), to the concerned WTRUs or all WTRUs after a decision is made by the base station. The command may be transmitted by any suitable means. For example, in UTRA Release 6, the command may be sent via an HS-SCCH. During each 2 ms TTI, the HS-SCCH includes information necessary for each WTRU to determine if any data will be transmitted to the WTRU in the next TTI. The HS-SCCH includes bits for indicating a channelization code set combination for the WTRU. Currently, there are eight (8) unused bit combinations for the channelization code set combinations. One of the 8 unused bit combinations may be used for the purpose of sending the command to change the CQI feedback period. For example, one of the unused bit combinations may be used to signal an increase of the CQI feedback period and another to signal a restoration of the original CQI feedback period.

The amount of change of the CQI feedback period in response to the command from the base station may be pre-determined, (e.g., by a factor of 2). Increase of the CQI feedback period by a factor of 2 means that every other CQI that would normally be transmitted with the original configuration is now not transmitted. Alternatively, the amount of change of the CQI feedback period in response to the command may be signaled upon call setup or reconfiguration. For example, two sets of CQI feedback periods may be given to the WTRU, and switched in accordance with the command.

The information contained in a specific TTI in an HS-SCCH is normally only used by one specific WTRU, which is identified through bit-masking of the CRC field with a WTRU-specific sequence, (WTRU identity (ID)). In order to provide a significant interference reduction on the uplink within a short amount of time, it is desirable that all WTRUs monitoring a given HS-SCCH be commanded a change of the CQI feedback period at the same time. Therefore, a special WTRU ID for all WTRUs may be used to transmit the command via the HS-SCCH.

Figure 3:
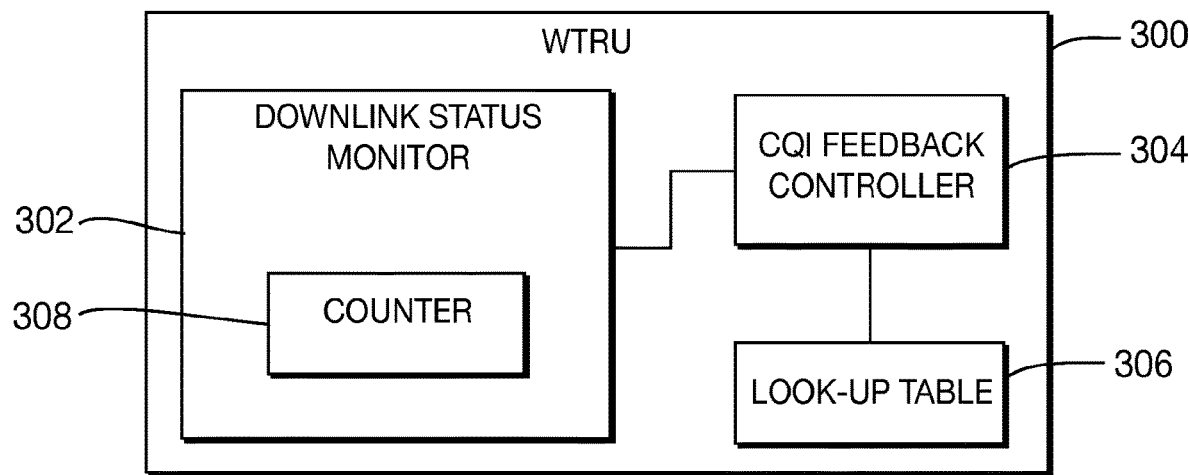
FIG. 3 is a block diagram of a WTRU which implements the process of FIG. 1.

FIG. 3 is a block diagram of a WTRU 300 which implements the process 100 of FIG. 1. The WTRU 300 includes a downlink status monitor 302, a CQI feedback controller 304 and an LUT 306 (optional). The downlink status monitor 302 monitors a status of downlink transmissions to the WTRU. The downlink status monitor 302 may include a counter 308 to count the number of consecutive TTIs that do not include transmissions to the WTRU. The CQI feedback controller 304 sets the CQI feedback period based on the status of the downlink transmissions to the WTRU as stated hereinabove.

Figure 4:
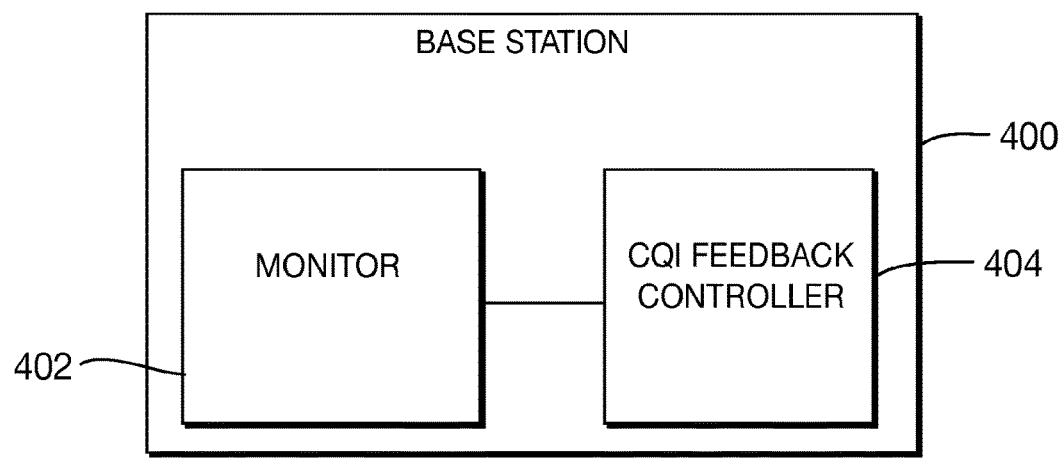
FIG. 4 is a block diagram of a base station which implements the process of FIG. 2.

FIG. 4 is a block diagram of a base station 400 which implements the process 200 of FIG. 2. The base station 400 includes a monitor 402 and a CQI feedback controller 404. The monitor 402 monitors uplink transmission needs and downlink transmission needs. The CQI feedback controller 404 determines the CQI feedback period of at least one WTRU based on the uplink transmission needs and the downlink transmission needs and sends a command to at least one of the WTRUs to change the CQI feedback period.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A method implemented by a base station, the method comprising:
   receiving, from a wireless transmit/receive unit (WTRU), channel quality indicator (CQI) information according to first CQI configuration information, wherein the first CQI configuration information is (i) a first of a plurality of CQI configuration information associated with more than one CQI feedback period for reporting CQI and (ii) associated with a first CQI feedback period of the more than one CQI feedback period;
   transmitting a message that (1) indicates that it is for the WTRU and (2) includes a CQI feedback command; and
   responsive to the message, receiving the CQI information according to second CQI configuration information, wherein the second CQI configuration information is (i) a second of the plurality of CQI configuration information (ii) associated with a second CQI feedback period of the more than one CQI feedback period.

2. The method of claim 1, comprising:
   transmitting a radio resource control message comprising the CQI configuration information associated with more than one CQI feedback period for reporting CQI.

3. The method of claim 1, wherein at least one of the more than one CQI feedback period is associated with a number of transmission time intervals between CQI information transmissions.

4. The method of claim 1, comprising:
   transmitting a physical downlink control channel transmission comprising the message masked with an identifier associated with the WTRU, wherein the message indicating that it is for the WTRU comprises the message being masked with the identifier associated with the WTRU.

5. The method of claim 1, wherein the first CQI feedback period is different than the second CQI feedback period.

6. The method of claim 1, wherein receiving the CQI information according to second CQI configuration information comprises:
   receiving the CQI information according to second CQI configuration information responsive to the message and the CQI feedback command.

7. A base station comprising circuitry including a transmitter, a receiver, a processor and memory, configured to:
   receive, from a wireless transmit/receive unit (WTRU), channel quality indicator (CQI) information according to first CQI configuration information, wherein the first CQI configuration information is (i) a first of a plurality of CQI configuration information associated with more than one CQI feedback period for reporting CQI and (ii) associated with a first CQI feedback period of the more than one CQI feedback period;
   transmitting a message that (1) indicates that it is for the WTRU and (2) includes a CQI feedback command; and
   responsive to the message, receiving the CQI information according to second CQI configuration information, wherein the second CQI configuration information is (i) a second of the plurality of CQI configuration information (ii) associated with a second CQI feedback period of the more than one CQI feedback period.

8. The base station of claim 7, wherein the circuitry is configured to:
   transmit a radio resource control message comprising the CQI configuration information associated with more than one CQI feedback period for reporting CQI.

9. The base station of claim 7, wherein at least one of the more than one CQI feedback reporting period is associated with a number of transmission time intervals between CQI information transmissions.

10. The base station of claim 7, wherein the circuitry is configured to:
    transmit a physical downlink control channel transmission comprising the message masked with an identifier associated with the WTRU, wherein the message indicates that it is for the WTRU at least in part by being masked with the identifier associated with the WTRU.

11. The base station of claim 7, wherein the first CQI feedback period is different than the second CQI feedback period.

12. The base station of claim 7, wherein the circuitry being configured to receive the CQI information according to second CQI configuration information comprises:
the circuitry being configured to receive the CQI information according to second CQI configuration information responsive to the message and the CQI feedback command.

13. An apparatus comprising circuitry, including a transmitter, a receiver, at least one integrated circuit (IC), a processor and a memory storing instructions executable by one or more of the at least one IC and the processor, configured to:
receive, from a wireless transmit/receive unit (WTRU), channel quality indicator (CQI) information according to first CQI configuration information, wherein the first CQI configuration information is (i) a first of a plurality of CQI configuration information associated with more than one CQI feedback period for reporting CQI and (ii) associated with a first CQI feedback period of the more than one CQI feedback period;
transmit a message that (1) indicates that it is for the WTRU and (2) includes a CQI feedback command; and
responsive to the message, receive the CQI information according to second CQI configuration information, wherein the second CQI configuration information is (i) a second of the plurality of CQI configuration information (ii) associated with a second CQI feedback period of the more than one CQI feedback period.

14. The circuitry of claim 13, wherein the circuitry is configured to:
transmit a radio resource control message comprising the CQI configuration information associated with more than one CQI feedback period for reporting CQI.

15. The circuitry of claim 13, wherein a CQI feedback reporting period is associated with a number of transmission time intervals between CQI information transmissions.

16. The circuitry of claim 13, wherein the circuitry is configured to:
transmit a physical downlink control channel transmission comprising the message masked with an identifier associated with the WTRU, wherein the message indicates that it is for the WTRU at least in part by being masked with the identifier associated with the WTRU.

17. The circuitry of claim 13, wherein the first CQI feedback period is different than the second CQI feedback period.

18. The circuitry of claim 13, wherein the circuitry being configured to receive the CQI information according to second CQI configuration information comprises:
the circuitry being configured to receive the CQI information according to second CQI configuration information responsive to the message and the CQI feedback command.

\* \* \* \* \*